United States Patent [19]

Takahara et al.

[11] Patent Number: 4,583,794

[45] Date of Patent: Apr. 22, 1986

[54] ELECTROMAGNETIC BEARING

[75] Inventors: Kenichi Takahara, Tokyo; Hajime Sudo, Yokohama, both of Japan

[73] Assignee: Kabushiki Kaisha Toshiba, Kawasaki, Japan

[21] Appl. No.: 660,215

[22] Filed: Oct. 12, 1984

[30] Foreign Application Priority Data

Feb. 3, 1984 [JP] Japan ................... 56-17794

[51] Int. Cl.$^4$ .......................... F16C 39/06
[52] U.S. Cl. ..................... 308/10; 378/132
[58] Field of Search ............ 308/10; 378/131, 132

[56] References Cited

U.S. PATENT DOCUMENTS

| | | |
|---|---|---|
| 3,878,395 | 4/1975 | Seifert et al. |
| 4,081,707 | 3/1978 | Hartl et al. |
| 4,167,671 | 9/1979 | Boden et al. |
| 4,468,801 | 8/1984 | Sudo et al. ............. 378/132 |
| 4,500,142 | 2/1985 | Brunet ................... 378/132 |
| 4,504,965 | 12/1982 | Ebersberger ........... 378/132 |

FOREIGN PATENT DOCUMENTS 0071456 9/1983 European Pat. Off. .

OTHER PUBLICATIONS

Patents Abstracts of Japan, vol. 8, No. 25(E-225) (1462), 2nd Feb. 1984; & JP-A-58 186 145 (Tokyo Shibaura Denki K. K.).

Technische Rundschau; vol. 50, No. 44, Nov. 1977, p. 15; "Magnetlager".

Primary Examiner—R. Skudy
Attorney, Agent, or Firm—Oblon, Fisher, Spivak, McClelland & Maier

[57] ABSTRACT

Two groups of magnetic poles are formed on each end of a columnar yoke. Four magnetic poles of each magnetic pole groups protrude from the center of the yoke at right angles to the longitudinal direction thereof. A ring-shaped magnetic pole is formed on that portion of the yoke between the first and second magnetic pole groups. Ring-shaped permanent magnets are fitted on the yoke between the ring-shaped magnetic pole and the two magnetic pole groups. A cylindrical magnetic field adjusting member is fitted on the magnetic poles and the permanent magnets. Outside of these members, a magnetic coupling member or ring-shaped member of a supported body is disposed coaxially with the magnetic field adjusting member. The magnetic coupling member is formed of a highly permeable magnetic material, and the magnetic field adjusting member is made of a magnetic material whose permeability is a little lower than that of the magnetic coupling member. With use of the magnetic field adjusting member, magnetic fluxes produced by coils wound around the magnetic poles and the yoke are spread in the circumferential direction of the magnetic field adjusting member between the magnetic field adjusting member and the magnetic coupling member.

9 Claims, 10 Drawing Figures

ELECTROMAGNETIC BEARING

BACKGROUND OF THE INVENTION

The present invention relates to an electromagnetic bearing for magnetically supporting a to-be-supported body in suspension, and more specifically to an electromagnetic bearing improved in its capability of adjusting the position of the to-be-supported body and reduced in the loss of magnetic energy.

Electromagnetic bearings are conventionally known as bearings for supporting an object such as a rotating body, in which the object is floated by magnetic force so that it has absolutely no contact with a stationary part. Because there is no contact, these magnetic bearings have various advantages: no mechanical abrasion, high durability, no mechanical noise, high-speed rotation, etc.

One such magnetic bearing is described in, for example, Japanese Patent Disclosure No. 19844/83. In this magnetic bearing, as shown in FIG. 1, a cylindrical rotating body or supported body 12 is disposed in a case 10. A cylindrical member 14 of the supported body 12 is formed of a nonmagnetic material. A pair of ring-shaped members 16 is attached individually to the upper and lower portions of the inner peripheral surface of the cylindrical member 14. The ring-shaped members 16 are formed of a highly permeable material. Inside the supported body 12, a magnetic supporting means 20 is set on a base 22 at the bottom of the case 10. Groups of magnetic poles 26 and 30 are formed on the upper and lower end portions, respectively, of a yoke 24 of the magnetic supporting means 20. Each magnetic pole group 26 or 30 includes four magnetic poles 26a, 26b, 26c and 26d (shown in FIG. 2) or 30a, 30b, 30c and 30d (only 30a and 30c are shown in FIG. 1) which project from the center of the yoke 24 toward each corresponding ring-shaped member 16 and intersect the yoke at right angles. The magnetic pole groups 26 and 30 face the upper portion of the upper ring-shaped member 16 and the lower portion of the lower ring-shaped member 16, respectively. A ring-shaped magnetic pole 34 is formed on that portion of the yoke 24 between the two magnetic pole groups 26 and 30. The ring-shaped magnetic pole 34 faces that portion of the cylindrical member 14 which extends between the two ring-shaped members 16. Ring-shaped permanent magnets 39 and 40 are arranged on those portions of the yoke 24 between the magnetic pole group 26 and the magnetic pole 34, and between the magnetic pole group 30 and the magnetic pole 34. Coils 28a, 28b, 28c, 28d, 32a, 32b, 32c and 32d (28b, 32b and 32d are not shown in FIG. 1) for adjusting the radial position of the supported body 12 are wound around the magnetic poles 26a, 26b, 26c, 26d, 30a, 30b, 30c and 30d, respectively. A pair of coils 36 and 38 wound around the yoke 24 are arranged individually on two flat surfaces of the ring-shaped magnetic pole 34. The coils 36 and 38 serve to adjust the longitudinal position of the supported body 12. The coils are energized, and magnetic fluxes delivered from the north pole of the permanent magnet 39 pass through the yoke 24, enter the ring-shaped members 16 via the magnetic pole group 26 and the magnetic pole 34, and return to the south pole of the permanent magnet 39, circulating in loops as indicated by broken lines in FIG. 1. Likewise, magnetic fluxes delivered from the permanent magnet 40 return thereto in loops indicated by the broken lines. For example, magnetic flux from the magnetic pole 26a enters the upper ring-shaped member 16 substantially at right angles to the peripheral surface thereof. Therefore, if the current to flow through the coil 28a is increased to raise the magnetic flux density, the supported body 12 moves toward the magnetic pole 26a. Thus, the radial position of the supported body 12 can be adjusted by regulating the currents to flow through the coil groups 28 and 32. Meanwhile, magnetic flux from the magnetic pole 34 enters the ring-shaped members 16 substantially at right angles to the lower and upper end faces of the upper and lower ring-shaped members 16 respectively. Accordingly, when the supported body 12 is located above a predetermined position thereof, the currents flowing through the coils 36 and 38 are increased and decreased, respectively, so that the magnetic fluxes from the magnetic pole 34 about to enter the upper and lower ring-shaped members 16 are intensified and weakened, respectively. Thus, the force of attraction between the upper ring-shaped member 16 and the magnetic pole 34 is increased to lower the supported body 12. The longitudinal and radial positions of the supported body 12 can independently be adjusted by regulating the coil energizing currents.

In the prior art electromagnetic bearing constructed in this manner, however, the magnetic fluxes flowing between the ring-shaped members 16 and the individual magnetic poles of the magnetic pole groups 26, 30 generally tend to concentrate at the edge portions of the magnetic poles. Thus, the magnetic fluxes are liable to be saturated at the edge portions. Saturation of the magnetic fluxes makes it impossible to control the radial position of the supported body 12. In consequence, it is hard to control the position of the supported body in a constant manner.

The density of the magnetic fluxes inside the ring-shaped members 16 is considerably higher in positions P1, P2, P3 and P4 near the individual magnetic poles of the magnetic pole group 26 than in positions Q1, Q2, Q3 and Q4 between the magnetic poles. If the magnetic flux distribution is such that the regions with high and low magnetic flux densities are alternately arranged along the circumferential direction of the ring-shaped members, the values of eddy currents produced on the rotating ring-shaped members are increased. These eddy currents dissipate part of the energy of the magnetic fluxes produced by the energizing currents, causing energy loss. The eddy currents increase in proportion to the change of magnetic flux density with respect to the time. Thus, if the rotational frequency of the rotating body becomes higher, then the eddy currents are increased in proportion. Therefore, the eddy currents attenuate the advantage of the electromagnetic bearing in permitting high-speed rotation. These drawbacks can be eliminated only by using a larger-sized motor with more power, that is, by increasing the size of the electromagnetic bearing.

SUMMARY OF THE INVENTION

The object of the present invention is to provide an electromagnetic bearing simple in construction, small-sized, greatly reduced in energy loss, and which facilitates adjustment of the position of an object to be supported.

According to the present invention, there is provided an electromagnetic bearing which comprises a magnetic supporting means including an elongated yoke, a plurality of magnetic poles protruding from the yoke in the direction substantially perpendicular to the longitudinal direction of the yoke, a plurality of coils for generating magnetic fluxes from the magnetic poles, and a magnetic field adjusting member formed of a ferromagnetic material and disposed in the region for the passage of the magnetic fluxes produced from the magnetic poles; and a supported body including a magnetic coupling member formed of a ferromagnetic material, whereby the magnetic fluxes produced from the magnetic poles spread in the magnetic field adjusting member and enter the magnetic coupling member through the magnetic field adjusting member.

According to the invention, the magnetic fluxes produced from the magnetic supporting means enter the magnetic coupling member to couple magnetically between the magnetic supporting means and the magnetic coupling member. As a result, the supported body is supported in suspension (no-contact state) by the magnetic supporting means.

The magnetic fluxes between the individual magnetic poles and the magnetic coupling member are spread by the magnetic field adjusting member. Namely, the magnetic resistance of the magnetic field adjusting member is smaller than that of the gap between the magnetic field adjusting member and the magnetic coupling member, so that the magnetic fluxes are spread in the magnetic field adjusting member before they go out into the gap. As a result, a magnetic field without any drastic spatial variation is formed between the magnetic field adjusting member and the magnetic coupling member. This indicates that the magnetic field generated on the faces of the magnetic poles are substantially extended into the region for the magnetic field adjusting member, facilitating the control of the position of the supported body.

If no magnetic field adjusting member is provided, as in the case of a prior art electromagnetic bearing, magnetic lines of force concentrate in the region near the magnetic poles without spreading from the magnetic poles toward the magnetic coupling member. In consequence, magnetic saturation is caused at the edges of the magnetic poles, so that most of the magnetic fluxes delivered from the magnetic poles extend in the projecting direction of the magnetic poles. Thus, when the direction of the magnetic force is inclined against the direction in which the supported body is to be moved to its original position, the transfer of the supported body requires a great magnetic force. However, even if the coils are supplied with high electric power, a sufficient force for the transfer of the supported body may not possibly be produced due to the saturation of the magnetic fluxes. As a result, the controllability of the magnetic bearing is lowered.

In the case of the present invention, on the other hand, the magnetic fluxes between the magnetic field adjusting member and the magnetic coupling member are spread by the magnetic field adjusting member, and can be distributed in a relatively wide region without saturating the magnetic fluxes extending in the same direction in which the supported body is to be moved. Since the magnetic fluxes produced by the energization of the coils are spread over the whole distribution region, the increment of the magnetic flux density caused by the increase of the energizing currents can be utilized efficiently. Thus, the current's efficiency and controllability are improved.

The magnetic flux between the magnetic poles, on one hand, and the magnetic coupling member, on the other, is denser near each pole than between any two adjacent poles. When the magnetic coupling member rotates or moves in a straight line, the magnetic fluxes about to enter the magnetic coupling member vary, so that eddy currents are produced in the magnetic coupling member. According to the present invention, however, the magnetic fluxes are distributed in a wide region as mentioned before, so that the change of the magnetic flux density between the magnetic field adjusting member and the magnetic coupling member with the passage of time accompanying the rotation of the supported body is reduced. As a result, the eddy currents produced in the magnetic coupling member are greatly decreased, so that the energy loss attributed to the production of the eddy currents is also reduced. Since the magnetic field adjusting member necessary for such an effect should be in the form of a hollow cylinder just large enough to cover the magnetic poles, the electromagnetic bearing according to the present invention is simple and small.

DETAILED DESCRIPTION OF THE PREFERRED EMBODIMENTS

Figure 4:
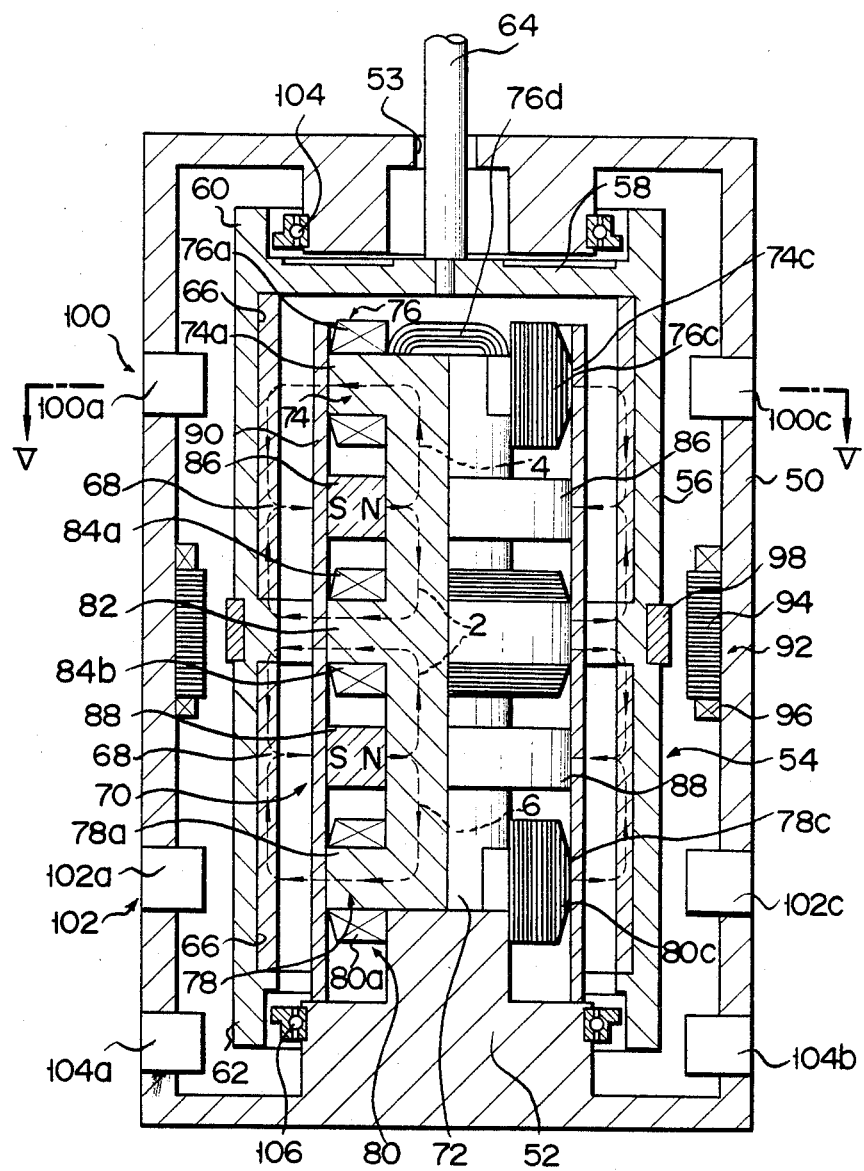
FIG. 4 is a longitudinal sectional view of an electromagnetic bearing according to one embodiment of the present invention.
Figure 5:
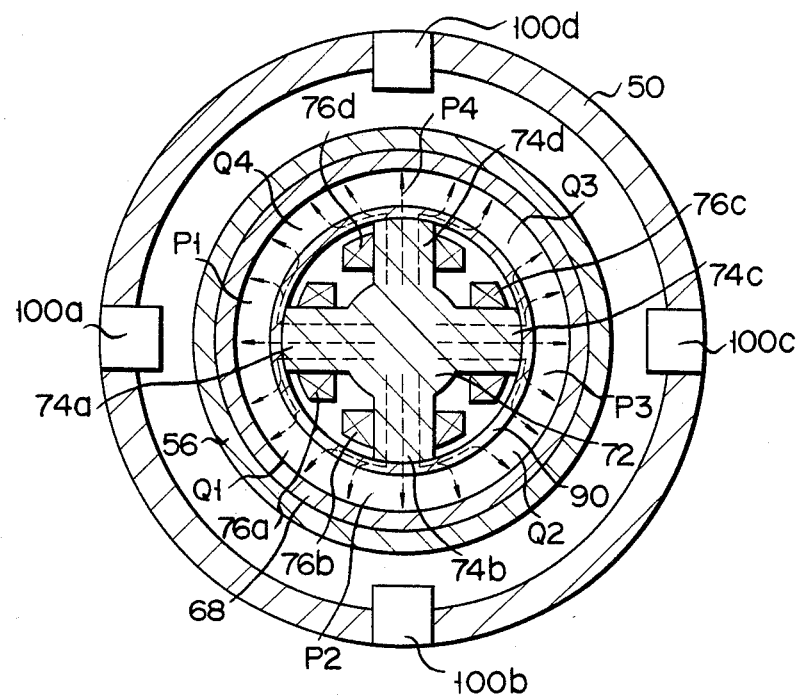
FIG. 5 is a sectional view taken along line V—V of FIG. 4.

FIG. 4 is a vertical sectional view of an electromagnetic bearing according to one embodiment of the present invention, and FIG. 5 is a sectional view taken along line V—V of FIG. 4. In the case where the electromagnetic bearing is used in space equipment or X-ray equipment, a grounded cylindrical case 50 having two end walls is formed of a material which intercepts magnetism. Thus, the case 50 can prevent penetration of external magnetism or leakage of internal magnetism. A supported body 54 made of a nonmagnetic material is disposed in the case 50 so as to be coaxial therewith. The supported body 54 is formed of a cylindrical member 56 and a top wall 58 at the top of the cylindrical member 56. A rotating shaft 64 is fixed to the top wall 58 so as to be coaxial with the cylindrical member 56. The rotating shaft 64 passes through a hole 53 in the end wall of the case 50 which faces the top wall 58, and is led out of the case 50. The rotating shaft 64 is coupled to a suitable object to be rotated (not shown). A pair of circumferentially extending endless grooves 66 is formed in the inner peripheral surface of the cylindrical member 56, vertically separated by a suitable distance. A magnetic coupling member or ring-shaped member 68 formed of a cylindrical highly permeable material is fitted in each of the grooves 66. The cylindrical member 56 is formed at the upper and lower ends thereof, respectively, with projecting peripheral wall portions 60 and 62 which extend along the circumferential direction of the cylindrical member 56 and which slightly project along the longitudinal direction of the member 56. Bearing members 104 and 106 are fixed to the case 50 so as to face the projecting peripheral wall portions 60 and 62, respectively.

Magnetic supporting means 70 is disposed inside the supported body 54. A yoke 72 of the magnetic supporting means 70, which is formed of a highly permeable material, is fixed on a base 52 of the case 50. A first group 74 of magnetic poles 74a, 74b, 74c and 74d (see FIG. 5) and a second group 78 of magnetic poles 78a, 78b, 78c and 78d (78b and 78d are not shown in FIGS. 4 and 5) are formed on the upper and lower ends, respectively, of the yoke 72, protruding therefrom toward the inner peripheral surface of the supported body 54. The magnetic poles 74a to 74d are arranged so that a straight line connecting the centers of the magnetic poles 74a and 74c and a straight line connecting the centers of the magnetic poles 74b and 74d intersect at right angles on the center of the yoke 72, as shown in FIG. 5. The magnetic poles 78a to 78d are arranged in the same manner as the magnetic poles 74a to 74d. A ring-shaped third magnetic pole 82 is formed on that portion of the yoke 72 which is located between the first and second magnetic pole groups 74 and 78, and which is aligned with that portion of the cylindrical member 56 between the upper and lower ring-shaped members 68. The length of projection of the magnetic poles of the magnetic pole groups 74 and 78 from the yoke 72 is equal to the distance between the respective peripheral surfaces of the ring-shaped third magnetic pole 82 and the yoke 72. Coils 76a, 76b, 76c, 76d, 80a, 80b, 80c and 80d (80b and 80d are not shown in FIGS. 4 and 5) for adjusting the radial position of the supported body 54 are wound around the magnetic poles 74a, 74b, 74c, 74d, 78a, 78b, 78c and 78d, respectively. Meanwhile, a pair of coils 84a and 84b for adjusting the axial position of the supported body 54 is wound around the yoke 72 so as to cover the top and bottom end faces of the third magnetic pole 82, respectively.

Ring-shaped permanent magnets 86 and 88 are fitted on those portions of the yoke 72 which extend between the first magnetic pole group 74 and the third magnetic pole 82, and between the third magnetic pole 82 and the second magnetic pole group 78, respectively. The width of the outer and inner peripheral surfaces of the permanent magnets 86 and 88 is equal to the length of projection of each magnetic pole. The permanent magnets 86 and 88 are magnetized in a direction such that, for example, the outer and inner peripheral surface sides of each permanent magnet constitute south and north poles, respectively.

A cylindrical magnetic field adjusting member 90 is set on the base 52 which is fitted on the first and second magnetic pole groups 74 and 78, the third magnetic pole 82, and the permanent magnets 86 and 88. The magnetic field adjusting member 90 is formed of a magnetic material with a permeability a little lower than that of the ring-shaped member 68, or is made considerably thinner than the ring-shaped member 68 in wall thickness. The distance between the magnetic field adjusting member 90 and the inner peripheral surface of the supported body 54 is adjusted to a proper magnetic air gap according to its application.

Groups of sensors 100 and 102 for detecting the radial position of the supported body 54 are attached to the case 50, facing their corresponding groups of magnetic poles 74 and 78 with the supported body 54 between them. Sensors 100a, 100b, 100c and 100d of the sensor group 100, and sensors 102a, 102b, 102c and 102d (102b and 102d are not shown in FIG. 4) of the sensor group 102 face the magnetic poles 74a, 74b, 74c, 74d, 78a, 78b, 78c and 78d, respectively. Further, sensors 104a and 104b for detecting the longitudinal position of the supported body 54 are disposed in positions facing the lower projecting peripheral wall portion 62 of the cylindrical member 56. These sensors may be formed of eddy-current displacement gauges or the like. The position of the supported body 54 is detected by using the two sensors 104a and 104b in a differential manner.

A motor 92 for rotating the supported body 54 is attached to those portions of the case 50 and the cylindrical member 56 near the third magnetic pole 82. The motor 92 includes a stator 94 fixed to the inner peripheral surface of the case 50 and a rotor 98 fixed to the outer peripheral surface of the cylindrical member 56. A coil 96 is wound around the stator 94. The supported body 54 supported in suspension by the magnetic supporting means 70 is rotated by the motor 92.

The outputs of the sensors 100, 102, 104a and 14b are applied to the inputs of the control devices (not shown) for the adjustment of the radial and longitudinal positions of the supported body 54. These control devices adjust the position of the supported body 54 by changing currents passed through the coils if the position of the supported body 54 detected by the sensors is deviated from a predetermined position.

The operation of the electromagnetic bearing constructed in this manner will now be described. As indicated by broken lines 2 in FIG. 4, magnetic fluxes produced by the coils 84a and 84b get into the cylindrical member 56 through the ring-shaped magnetic pole 82 and diverge from the cylindrical member 56 toward the two ring-shaped members 68 so that the magnetic fluxes enter the ring-shaped members 68 at right angles to the lower and upper end faces of the upper and lower ring-shaped members 68, respectively. These magnetic fluxes pass through the ring-shaped members 68, enter the permanent magnets 86 and 88 via the magnetic field adjusting member 90, and return to the ring-shaped magnetic pole 82 through the yoke 72. Thus, the magnetic fluxes from the coils 84a and 84b cause magnetic forces to act on the ring-shaped members 68 at right angles to the end faces thereof (along the longitudinal direction), so that the supported body 54 is supported in suspension. In this case, the magnetic fluxes directed from the magnetic pole 82 toward the ring-shaped members 68 partially enter the ring-shaped members 68 at right angles to the inner peripheral surfaces thereof. These magnetic fluxes cause magnetic forces to act radially on the supported body 54. These magnetic forces cancel one another, since they act substantially uniformly in the radial direction from the center of the magnetic pole 82. In consequence, the supported body 54 will never be subjected to a radial force attributed to the magnetic fluxes produced by the coils 84a and 84b.

As indicated by broken lines 4 in FIG. 4, on the other hand, magnetic fluxes produced by the coil group 76 (coils 76a and 76d) enter the upper ring-shaped member 68 via the magnetic poles 74a to 74d and the magnetic field adjusting member 90 substantially at right angles to the inner peripheral surface of the upper ring-shaped member 68, pass through the upper ring-shaped member 68 along its longitudinal direction, get into the permanent magnet 86 via the magnetic field adjusting member 90, and return to the magnetic pole group 74. Likewise, magnetic fluxes produced by the coil group 80 (coils 80a to 80d) are delivered from the magnetic poles 78a and 78d, and enter the lower ring-shaped member 68 substantially at right angles to the inner peripheral surface thereof via the magnetic field adjusting member 90. Then, the magnetic fluxes pass through the lower ring-shaped member along the longitudinal direction thereof, enter the permanent magnet 88 via the magnetic field adjusting member 90, and return to the magnetic pole group 78 through the yoke 72. Thus, magnetic forces act in the direction substantially perpendicular to the inner peripheral surfaces of the ring-shaped members 68 between the upper ring-shaped member 68 and the magnetic poles 74a to 74d of the upper magnetic pole group 74 and between the lower ring-shaped member 68 and the magnetic poles 78a to 78d of the lower magnetic pole group 78, and the supported body 54 is supported in its radial direction. In consequence, the supported body 54 is supported at its upper and lower end portions by radial magnetic forces from the magnetic pole groups 74 and 78, respectively.

If the coil 96 of the motor 92 is energized while the supported body 54 is supported in suspension (no-contact state) by the magnetic supporting means, the supported body 54 rotates, so that the object of rotation is rotated through the medium of the rotating shaft 64.

In this case, the magnetic fluxes between the magnetic poles and the ring-shaped members 68 are spread by the magnetic field adjusting member 90 in the circumferential direction thereof. For example, the flow of the magnetic fluxes between the magnetic pole group 74 and the upper ring-shaped member 68 changes in the manner as indicated by the broken-line arrows in FIG. 5. Namely, the magnetic resistance of the magnetic field adjusting member 90 is smaller than that of the gap between the magnetic field adjusting member 90 and each ring-shaped member 68. Accordingly, the magnetic fluxes from the magnetic poles 74a to 74d of the magnetic pole group 74 partially pass through the magnetic field adjusting member 90 along its circumferential direction, and then enter the ring-shaped members 68. As a result, magnetic lines of force are spread between the magnetic field adjusting member 90 and each ring-shaped member 68, as shown in FIG. 5, to form a magnetic field with a gentle spatial variation. This indicates that the magnetic field generating surfaces of the magnetic poles of the magnetic pole group 74 are substantially extended in the circumferential direction of the magnetic field adjusting member 90, facilitating the control of the radial position of the supported body 54. The magnetic fluxes between the magnetic poles of the other magnetic pole group 78 and the lower ring-shaped member 68 are uniformly distributed in the same manner as the magnetic fluxes between the magnetic pole group 74 and the upper ring-shaped member 68.

Meanwhile, if a radial external force is applied to the supported body 54 through the rotating shaft 64, the supported body 54 radially shifts its position. For example, if the supported body 54 moves away from the magnetic poles 74a and 74d or in the direction indicated by an arrow 8 of FIG. 6A, the distance between the supported body 54 and each of the sensors 100a and 100d is narrowed, while that between the supported body 54 and each of the sensors 100b and 100c is widened. The outputs of the sensors 100a to 100d are applied to the input of the control device for radial position adjustment, whereby the coil energizing currents are corrected in accordance with the displacement of the supported body 54. Namely, the currents flowing through the coils 76a and 76d are increased, while the currents flowing through the coils 76b and 76c are decreased. Thereupon, the magnetic flux density between the magnetic poles 74a and 74d and the upper ring-shaped member 68 is raised, while that between the magnetic poles 74b and 74c and the upper ring-shaped member 68 is lowered. As a result, the forces of the magnetic poles 74a and 74d to attract the upper ring-shaped member 68 are intensified, so that the supported body 54 moves toward the magnetic poles 74a and 74d. As the supported body 54 moves in this manner, the displacement caused by external force is corrected, and the supported body 54 returns to its original position.

Figure 6A:
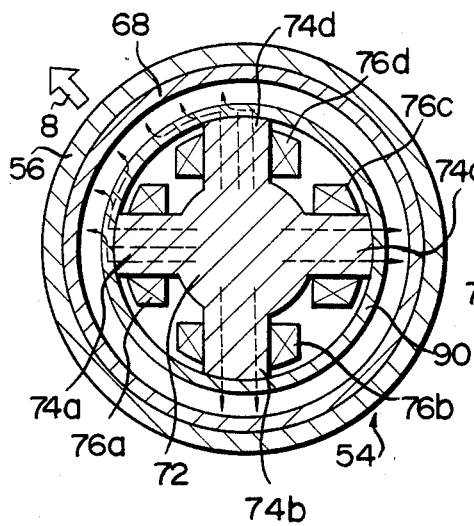
FIGS. 6A and 6B are cross-sectional views illustrating the effects of the invention.
Figure 6B:
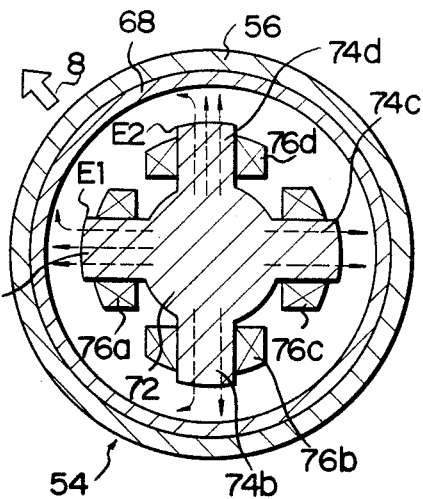

If the magnetic field adjusting member 90 is not provided as in the case of a prior art electromagnetic bearing, the magnetic lines of force are distributed as shown in FIG. 6B. In this case, the magnetic fluxes concentrate in the region near the magnetic poles without spreading in the circumferential direction of the supported body 54. Accordingly, magnetic saturation is caused at edge portions E1 and E2 of the magnetic poles 74a and 74d, so that most of the magnetic fluxes delivered from the magnetic poles 74a and 74d advance at an angle of 45 degrees to the direction of the displacement (indicated by the arrow 8), and strike the inner peripheral surface of the upper ring-shaped member 68. Thus, the direction of the magnetic force is inclined against the direction in which the supported body is to be moved to its original position, so that the transfer of the ring-shaped members 68 requires a great magnetic force and hence high electric power to be supplied to the coils 76a and 76d. Accordingly, magnetic saturation may possibly be caused at the magnetic poles 74a and 74d, lowering controllability.

In this embodiment, on the other hand, the magnetic fluxes between the magnetic field adjusting member 90 and the ring-shaped members 68 are spread in the circumferential direction of the magnetic field adjusting member 90 by the magnetic field adjusting member 90, as shown in FIG. 6A, and the sum of the vectors of the magnetic fluxes directed toward the magnetic poles act as control forces. Hereupon, the magnetic fluxes are distributed in a wide region, and a relatively great part of the magnetic fluxes extend in the same direction in which the supported member 54 is to be moved (opposite to the direction of displacement indicated by the arrow 8) without causing any local magnetic saturation. Accordingly, a considerable portion of the magnetic fluxes produced by the energization of the coils 76a and 76d are parallel to the moving direction of the supported body 54, so that the variation of the magnetic flux density caused by the variation of the energizing currents can be utilized effectively. Thus, current efficiency and controllability are improved.

Figure 1:
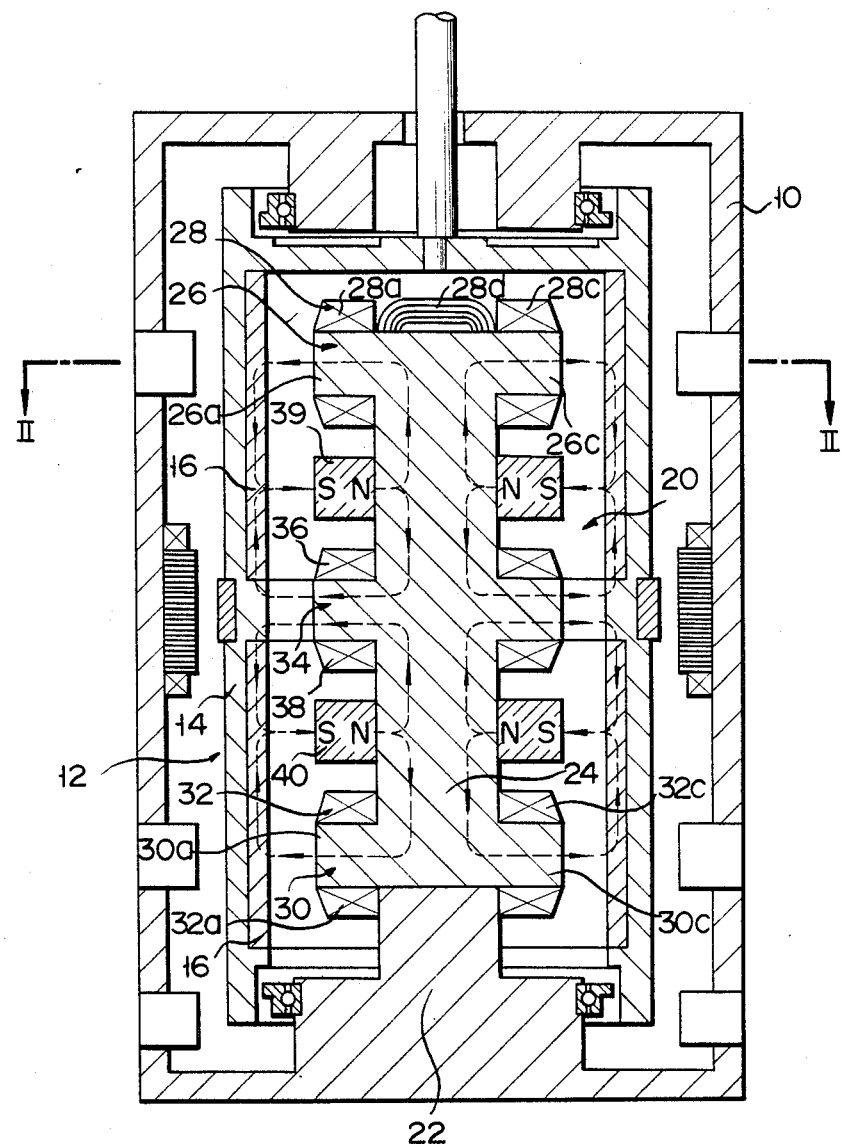
FIG. 1 is a longitudinal sectional view of a prior art electromagnetic bearing.
Figure 2:
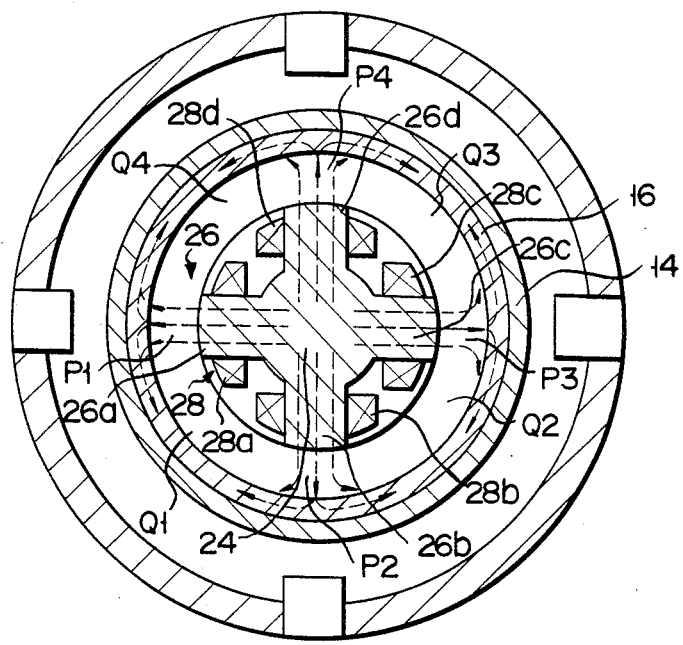
FIG. 2 is a sectional view taken along line II—II of FIG. 1.
Figure 3:
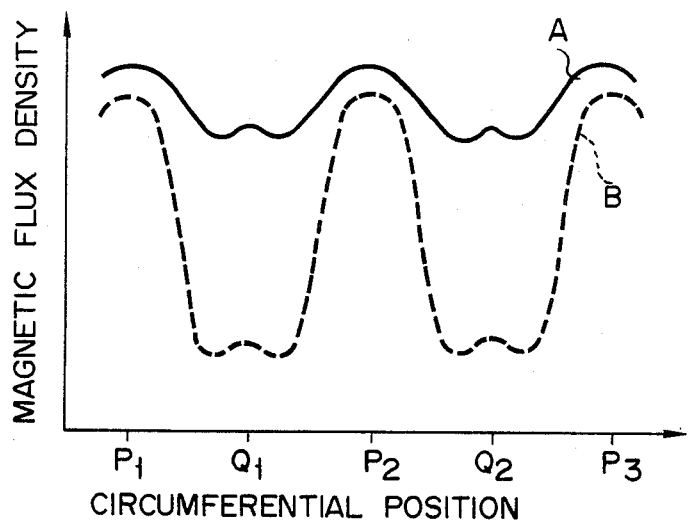
FIG. 3 is a graph showing the variation of magnetic flux density.

FIG. 3 shows the change of magnetic flux density along the circumferential direction of the ring-shaped members 68 at positions P1, P2, P3 and P4 near the individual magnetic poles and at positions Q1, Q2, Q3 and Q4 between the magnetic poles (see FIG. 5). In FIG. 3, the solid line A represents the case of this embodiment (FIG. 6A), and the broken line B of the prior art (FIG. 6B). As seen from FIG. 3, the magnetic flux density greatly varies along the circumferential direction of the ring-shaped members in the prior art magnetic bearing. In this embodiment, on the other hand, the magnetic flux density is relatively uniform with respect to the circumferential direction of the ring-shaped members 68. Therefore, the variations of the magnetic fluxes which enter the ring-shaped members 68 of the supported body 54 caused by the rotation of the ring-shaped members 68 are reduced, so that the eddy currents produced in the ring-shaped members 68 are greatly reduced. As a result, the energy loss attributed to the production of the eddy currents is reduced. Since the magnetic field adjusting member 90 to enhance such an effect should be in the form of a hollow cylinder just large enough to cover the magnetic poles, the magnetic bearing of this embodiment is simple and small. The magnetic field adjusting member is not limited to the cylindrical configuration, and may be in the form of slits formed between the magnetic poles, or a combination of pieces which cover the pole faces of the individual magnetic poles, etc.

Figure 7:
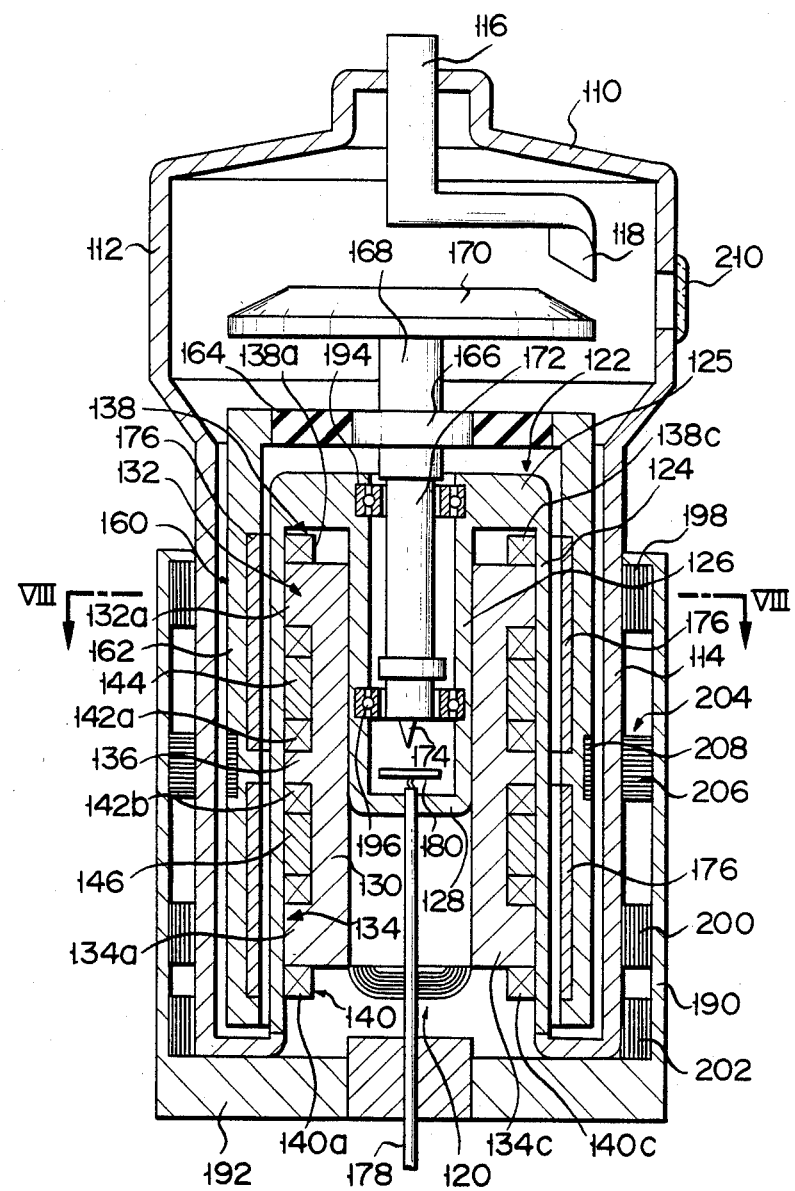
FIG. 7 is a longitudinal sectional view of an electromagnetic bearing according to another embodiment of the invention.
Figure 8:
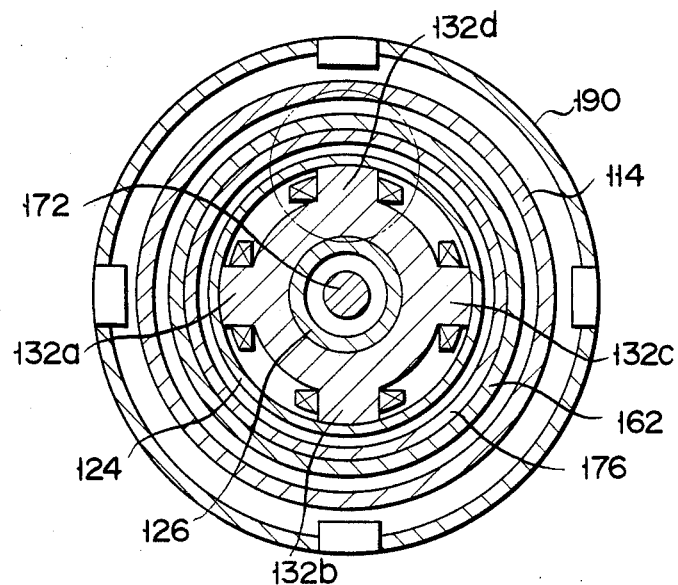
FIG. 8 is a sectional view taken along line VIII—VIII of FIG. 7.
Figure 9:
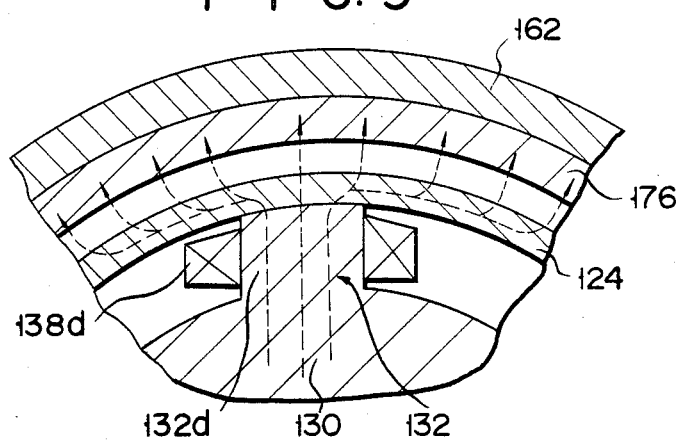
FIG. 9 is an enlarged sectional view showing part of FIG. 8.

Referring now to FIGS. 7 to 9, another embodiment of the present invention will be described. This second embodiment is applied to a bearing used in a rotating-anode X-ray tube. The interior of a case 110 formed of an insulating material is kept in a vacuum by an exhaust system (not shown). The case 110 has an upper wall portion 112 defining a chamber to contain an X-ray generating device therein and a lower wall portion 114 housing the bearing. A supporting rod 116 is hermetically selected to the top end of the upper wall portion 112. A cathode 118 is hermetically fixed to the extreme end of the supporting rod 116. A filament (not shown) is attached to the extreme end of the cathode 118. Both ends of the filament are electrically connected to an external power source by conductors passed through the supporting rod 116. Disposed inside the upper wall portion 112 is a rotating anode 170 which is supported by a rotor or supported body 160 mentioned later. The rotating anode 170 is fixed to a rotating shaft 168 which is fixed at right angles to a top end wall 166 of the supported body 160. The rotating anode 170 is in the form of a truncated cone. The rotating anode 170 and the cathode 118 are arranged so that the slope of the rotating anode 170 faces the cathode 118 when the rotating anode 170 is rotated around the rotating shaft 168. The upper wall portion 112 is provided with an X-ray window 210 in the vicinity of the cathode 118. Thus, X-rays produced between the cathode 118 and the rotating anode 170 are taken out through the X-ray window 210.

The lower wall portion 114 is in the form of a hollow cylinder whose bottom end slightly extends inward to form a bottom end face. The lower wall portion 114 is fitted in a case 190 in the form of a bottomed hollow cylinder made of a non- or paramagnetic material, and is set on a bottom portion 192 of the case 190. The case 190 intercepts external magnetism. A magnetic field adjusting member 122 of magnetic supporting means 120 is fixed to the inside end portion of the lower wall portion 114. The magnetic field adjusting member 122 includes an outer cylinder portion 124, an inner cylinder portion 126 smaller than the outer cylinder portion 124 in both diameter and length, a top end portion 125 connecting the respective top ends of the outer and inner cylinder portions 124 and 126, and a bottom portion 128 constituting the bottom of the inner cylinder portion 126. The magnetic field adjusting member 122 is formed of a highly permeable material.

A hollow cylindrical yoke 130 is set between the outer and inner cylinder portions 124 and 126. First and second magnetic pole groups 132 and 134 each including four magnetic poles are formed on the upper and lower ends, respectively, of the yoke 130, protruding outward therefrom, that is, toward the outer cylinder portion 124. As in the first embodiment of FIG. 4, individual magnetic poles 132a, 132b, 132c, 132d, 134a, 134b, 134c and 134d (134b and 134d are not shown) of the first and second magnetic groups 132 and 134 are located on straight lines intersecting at right angles on the central axis of the yoke 130. A ring-shaped third magnetic pole 136 is formed on that portion of the yoke 130 between the first and second magnetic pole groups 132 and 134. A ring-shaped permanent magnet 144 magnetized in the radial direction is fitted on that portion of the yoke 130 between the first magnetic pole group 132 and the ring-shaped magnetic pole 136. Likewise, a ring-shaped permanent magnet 146 magnetized in the radial direction is fitted on that portion of the yoke 130 between the ring-shaped magnetic pole 136 and the second magnetic pole group 134. The first and second magnetic pole groups 132 and 134, the ring-shaped third magnetic pole 136, and the ring-shaped permanent magnets 144 and 146 are in contact with the inner peripheral surface of the outer cylinder portion 124 of the magnetic field adjusting member 122. Coils 138a, 138b, 138c and 138d of a first coil group 138, and coils 140a, 140b, 140c and 140d (140b and 140d are not shown) of a second coil group 140 are wound around the individual magnetic poles 132a, 132b, 132c, 132d, 134a, 134b, 134c and 134d of the first and second magnetic pole groups 132 and 134, respectively. Coils 142a and 142b are wound around the yoke 130 so as to be in contact with two flat surfaces of the third magnetic pole 136, individually. The integral structure consisting of the yoke 130 and the magnetic poles can be formed by bonding together longitudinal divisions of the yoke after fitting the permanent magnets and the coils on the division joined together.

A cylindrical member 162 of the supported body 160 is disposed in the space between the lower wall portion 114 and the outer cylinder portion 124.

A ring-shaped insulating member 164 is fixed to the top end of the cylindrical member 162, and a disk-shaped top end member 166 is fixed on the inner peripheral surface side of the insulating member 164. A rotating shaft 172 is fixed to the center of the undersurface of the top end member 166, extending along the axis of the cylindrical member 162 perpendicular to the undersurface of the top end member 166. The rotating shaft 172 is set inside the inner cylinder member 126. A pair of bearing means 194 and 196 are fixed to the inner peripheral surface of the inner cylinder member 126 so as to surround the rotating shaft 172. When the supported body 160 is floated by the magnetic supporting means 120, the bearing means 194 and 196 are not in contact with the rotating shaft 172.

Upper and lower circumferential grooves are cut in the inner peripheral surface of the cylindrical member 162 of the supported body 160. Two cylindrical magnetic coupling members or ring-shaped members 176 having a permeability higher than that of the magnetic field adjusting member 122 are fitted individually in the two grooves. That portion of the cylindrical member 162 between the two ring-shaped members 176 faces the ring-shaped magnetic pole 136 with the outer cylinder portion 124 between them.

A conductive pin 174 is fixed to the lower end of the rotating shaft 172. A conductive contact plate 180 provided at the bottom portion 128 is urged toward the pin 174 for contact therewith. A conduit 178 is fixed to the bottom portion 128, penetrating the same in an airtight manner. A conductor fixed to the contact plate 180 is led out through the conduit 178. Thus, the rotating anode 170 is supplied with electric power through the conductor, the contact plate 180, and the pin 174.

Sensors 198 and 200 for detecting the radial position of the cylindrical member 162 of the supported body 160 are arranged between the case 190 and the lower wall portion 114 of the case 110. A motor 204 for rotating the supported body 160 is disposed between the sensors 198 and 200. The motor 204 includes a stator 206 fixed to the case 190 and a rotor 208 provided to the outer peripheral surface of the cylindrical member 162.

In the rotating-anode tube constructed in this manner, as in the first embodiment shown in FIGS. 4 and 5, the rotor or supported body is supported in suspension by magnetic fluxes from the magnetic supporting means. The supported body in suspension is rotated by the motor, so that the rotating anode is rotated relatively to the cathode. A voltage is applied between the anode and cathode to generate X-rays. In this embodiment, as in the first embodiment of FIGS. 4 and 5, the pole faces of the magnetic poles are covered with the magnetic field adjusting member 124 which is formed of a material thinner than the ring-shaped members 176 or a highly permeable material with a permeability a little lower than that of the ring-shaped members 176. As indicated by the broken-line arrows in FIG. 9, therefore, magnetic fluxes delivered from, e.g., the magnetic pole 132d spread through the magnetic field adjusting member 124 along the circumferential direction thereof, are distributed between the ring-shaped member 176 and the magnetic field adjusting member 124 with a spread to form a magnetic field with a gentle spatial variation. Also in this embodiment, therefore, the controllability for the position adjustment of the supported body 160 is improved, and the electrical energy loss can be reduced. In this second embodiment, moreover, the magnetic field adjusting member may be formed as a part of a vacuum container for containing the cathode, rotating anode, and rotor (supported body). Accordingly, the effect of the invention may be secured without making the electromagnetic bearing bulkier or more complicated. Furthermore, the gap between each ring-shaped member 176 and its corresponding magnetic poles is shortened by the existence of the magnetic field adjusting member 124, so that controllability and energy efficiency can further be improved.

In the embodiments described above, the supported body floated by magnetic force is in the form of a hollow cylinder which rotates. However, the present invention may also be applied to a bearing for supporting an object which reciprocates in a straight line or rocks. In the above embodiments, moreover, the magnetic supporting means is disposed inside the supported body. Alternatively, however, the supported body may be set inside the magnetic supporting means.

What is claimed is:

1. An electromagnetic bearing comprising:
magnetic supporting means including an elongated yoke, a plurality of magnetic poles protruding from the yoke in the direction substantially perpendicular to the longitudinal direction of the yoke, a plurality of coils for generating magnetic fluxes from the magnetic poles, and a magnetic field adjusting member formed of a magnetic material and disposed in the region for the passage of the magnetic fluxes produced from the magnetic poles; and
a supported body including a magnetic coupling member formed of a magnetic material, whereby the magnetic fluxes produced from the magnetic poles spread in the magnetic field adjusting member, and enter the magnetic coupling member through the magnetic field adjusting member.

2. The electromagnetic bearing according to claim 1, wherein said magnetic field adjusting member has a permeability lower than that of the magnetic coupling member.

3. The electromagnetic bearing according to claim 1, wherein said magnetic coupling member is in the form of a hollow cylinder, and said magnetic supporting means is disposed inside the magnetic coupling member.

4. The electromagnetic bearing according to claim 3, wherein said magnetic field adjusting member is in the form of a hollow cylinder coaxial with the magnetic coupling member.

5. The electromagnetic bearing according to claim 4, wherein said magnetic supporting means includes first and second groups of magnetic poles formed in two positions of the yoke spaced apart along the longitudinal direction of the yoke and a plurality of coils wound around the magnetic poles, each of said first and second magnetic pole groups including four magnetic poles arranged so that a segment connecting two out of the four magnetic poles and a segment connecting the other two intersect at right angles on the middle point of each said segment.

6. The electromagnetic bearing according to claim 5, wherein said magnetic supporting means includes a ring-shaped third magnetic pole formed on that portion of the yoke between the first and second magnetic pole groups and coils wound around the yoke so as to be individually in contact with two flat surfaces of the third magnetic pole.

7. The electromagnetic bearing according to claim 6, wherein said magnetic supporting means includes ring-shaped permanent magnets fitted on those portions of the yoke between the first magnetic pole group and the third magnetic pole, and between the third magnetic pole and the second magnetic pole group.

8. The electromagnetic bearing according to claim 7, wherein the end faces of the individual magnetic poles of the first and second magnetic pole groups, the peripheral surface of the third magnetic pole, and the outer peripheral surfaces of the permanent magnets are in contact with the inner peripheral surface of the magnetic field adjusting member.

9. The electromagnetic bearing according to claim 8, wherein said supported body includes a hollow cylindrical member formed of a nonmagnetic material, and said magnetic coupling member is disposed inside the cylindrical member.

* * * * *